United States Patent [19]

Lechler

[11] 4,203,319

[45] May 20, 1980

[54] APPARATUS FOR MEASURING BEARING FORCES

[76] Inventor: Gerhard B. Lechler, Muehlenstrasse 58, 1000 Berlin 46, Fed. Rep. of Germany

[21] Appl. No.: 950,464

[22] Filed: Oct. 11, 1978

[30] Foreign Application Priority Data

Oct. 17, 1977 [DE] Fed. Rep. of Germany ....... 2746937

[51] Int. Cl.² .............................................. G01L 5/12
[52] U.S. Cl. .................................... 73/141 A; 73/140
[58] Field of Search ................. 73/133 R, 141 A, 143, 73/118

[56] References Cited

U.S. PATENT DOCUMENTS

| 3,900,812 | 8/1975 | Brewer | 338/2 |
| 4,117,719 | 10/1978 | Schutz | 73/141 A |

OTHER PUBLICATIONS

Stein, P., Measuring Bearing Strain, from Instruments and Control Systems, vol. 37, Nov. 1964, pp. 132-138.

*Primary Examiner*—Jerry W. Myracle
*Attorney, Agent, or Firm*—Parmelee, Johnson, Bollinger & Bramblett

[57] ABSTRACT

An apparatus for the measuring of external forces by means of a preloaded roller bearing, provided with at least two strain gauges which serve to measure the forces applied to the bearings, in which apparatus the resistance variations of the strain gauge(s) are recorded individually, amplified individually and rectified individually, whereby signals which are proportional to the external forces are obtained through subtraction from the rectified signals, while due to said subtraction those parts of the individually amplified and rectified signals due to internal forces are eliminated.

11 Claims, 11 Drawing Figures

APPARATUS FOR MEASURING BEARING FORCES

BACKGROUND OF THE INVENTION

The invention refers to an apparatus for measuring forces by means of at least one roller bearing, of which the outer and/or inner ring, at different points of the bearing, are provided with at least two strain gauges which serve to record the forces to be measured, and of which the resistance variations are amplified and forwarded for their use.

An apparatus of the above mentioned kind is well known, which measures strains generated in the outer rings as a result of the load applied by the roll bodies. In this apparatus, the strains generated on the stationary outer ring of the bearing, as a result of being rolled over by the loaded roll bodies, are measured by means of gauges provided in four areas of the bearing. When a roll body lies within the measuring range, the strain is at its maximum, and when the measuring range lies between the roll bodies, the strain is close to zero. The rolling over of a given measuring range in the outer ring thus occurs in the form of a harmoniously alternating strain load. The number of strain peaks per time unit corresponds to the number of roll bodies rolling over the measuring range within the same time unit. To mount the roller bearing in a conventional manner, the strain gauges arranged in the peripheral area of the outer ring, are placed in notches or small cuts. The measuring grids of the strain gauges run perpendicular to the roller bearing axis. The strains of the strain gauges are recorded, amplified and made visible in an oscillograph or a recorder, of which the cutoff frequency has to be at least twice as high as the roll-over frequency. The roll-over frequency results from the speed of the shaft n, the diameter of the roll body D, the pitch diameter d, the number of roll bodies z and the angle of contact $\alpha$ in the bearing (Instrumens & Control Systems 1964, 132 et al.). With this well-known apparatus it is not possible to accurately record the load on the bearing for a long period of time and in such a manner that the measuring signal, which is proportional to the force, can subsequently be used for process controlling purposes. Indeed, the load acting between the roller matings is not solely dependent on the forces attacking from the outside. In prestressed roller bearings, even in unloaded contition, forces will already be active between the roll bodies and the bearing rings. On the other hand, in bearings with play, the portion of the total load carried by a roll body, will depend on the play of the bearing. However, the prestressing or play of a roller bearing are quantities which change during the operation. In the operating condition there normally occurs a temperature drop from the inner to the outer ring of the roller bearing, following which the play of the bearing will decrease or the initial stress will increase. Furthermore, the measured alternating strain in the well-known apparatus, because of unavoidable formal defects in the bearing, is not constant. Formal defects in the inner ring and differences in the diameter of the roll bodies mean that the amplitudes of the alternating strain will fluctuate around an average value. In addition, due to hydrodynamic phenomena in the lubricant, especially at high speeds, strains can occur in the outer ring which are not generated by external forces. Beyond this, imbalances in the amplitude of the alternating signal may superpose themselves in the form of beats. An evaluation of the measuring signal in prestressed bearings is further complicated in that the ascent of the strain already generated by the initial stress, will be so little affected by an external force that an increase in the amplitude of the alternating strain will hardly be visible.

The well-known above described apparatus has therefore a number of serious drawbacks. The evaluation requires recording instruments of which the cutoff frequency has to be at least twice as high as the rolling-over frequency. The evaluation of the measuring results is made difficult, if not impossible, in that the strains generated by external forces are substantially lower than the strains caused by the initial stress in the bearing. The prestressing or the play of the bearing will be modified during the operation through variable heating of the inner-outer-ring and the roll bodies. This in turn originates changes in the signals which are not traceable to external forces. Strain changes not resulting from external loads, especially at high speeds, are generated by hydrodynamic phenomena in the lubricant. Formal defects in the bearing, imbalances and centrifugal forces cause the alternating strain amplitude to fluctuate around an average value which is difficult to determine. Finally, the so obtained signal is not suited for further use in a process-controlling action.

A force-measuring roller bearing is also well known in which a static measuring device is used. In this bearing the measuring grid length is selected in such a manner that it represents a multiple of the roll body distance. However, since the measuring grid is not extended in its full length, whereas the recorded strains are very small, it is necessary to select amplifiers with a very high amplifying factor. Owing to the well-known drawbacks of d.c. voltage amplification, this will make the measurements very unreliable.

Both well-known apparatuses do not allow to measure a load applied to the bearing by external forces for any long period of time.

SUMMARY OF THE INVENTION

The object of the invention is to provide an apparatus as described in the preamble, which allows to record the load applied to a bearing by external forces, as much as possible irrespective of the working condition of the bearing and for extended periods of time.

According to the invention, this object is reached in that the roller bearing is preloaded, that the resistance variations of the strain gauge(s) arranged at a measuring point, are recorded individually, that the recorded measured values of at least two measuring points, after they have been individually amplified, are individually rectified, and that signals which are proportional to the external forces, are obtained through subtraction from the rectified signals, while due to said subtraction those parts of the individually amplified and rectified signals due to the internal forces are eliminated.

By recording the strains separately at, at least, two measuring points and by separate amplification and rectification, difficulties and errors in the measurements, as they occurred with the well-known apparatuses, are avoided. Formal defects in the inner and outer ring and the roll bodies, as well as imbalances, are eliminated from the measuring signal through automatic value-averaging in the rectifier with respect to the characteristics of the rectifier. The value-averaging is necessary because the amplitude of the AC-signals associated with the measuring points is changing for instance due to differences of the diameters of the roll bodies of the bearing. The strains recorded at the measuring points and originating from prestressed forces, hydrodynamic phenomena in the lubricant and centrifugal forces, are cancelled out by the subtraction of the signals, i.e. the signalling portions originating from internal forces acting in the bearing, are filtered out by the subtraction. Changes in the internal forces by heating, speed changes or the like, are also eliminated by the subtraction. The signals which are proportional to the external forces and result from the subtraction, can be recorded with a recording instrument of low natural frequency. They can be treated further in appropriate circuits. Their digitization is possible. The signals can be supplied to a regulator in which e.g. limit values are preset or specified, so that when they are exceeded, a control impulse will be released.

It is especially advantageous to place the measuring points, of which the signals are subtracted, opposite to each other. It was found that an arrangement of this kind is particularly sensitive. In addition, it allows to eliminate forces which act in perpendicular to the connecting line of the measuring points. Such an elimination is desirable e.g. in the case of measuring cutting forces in machine tools, so as not to have the measurement result vitiated by the driving forces.

In a preferred embodiment, two strain gauges are arranged at each measuring point. The advantage of this arrangement with two gauges which can be arranged in a semi-bridge circuit, resides in the doubling of the amplitude of the alternating signal, as compared to the arrangement with only one active strain gauge.

The invention is further explained below, on the basis of the attached drawings.

DETAILED DISCUSSION OF THE DRAWINGS

Figure 1:
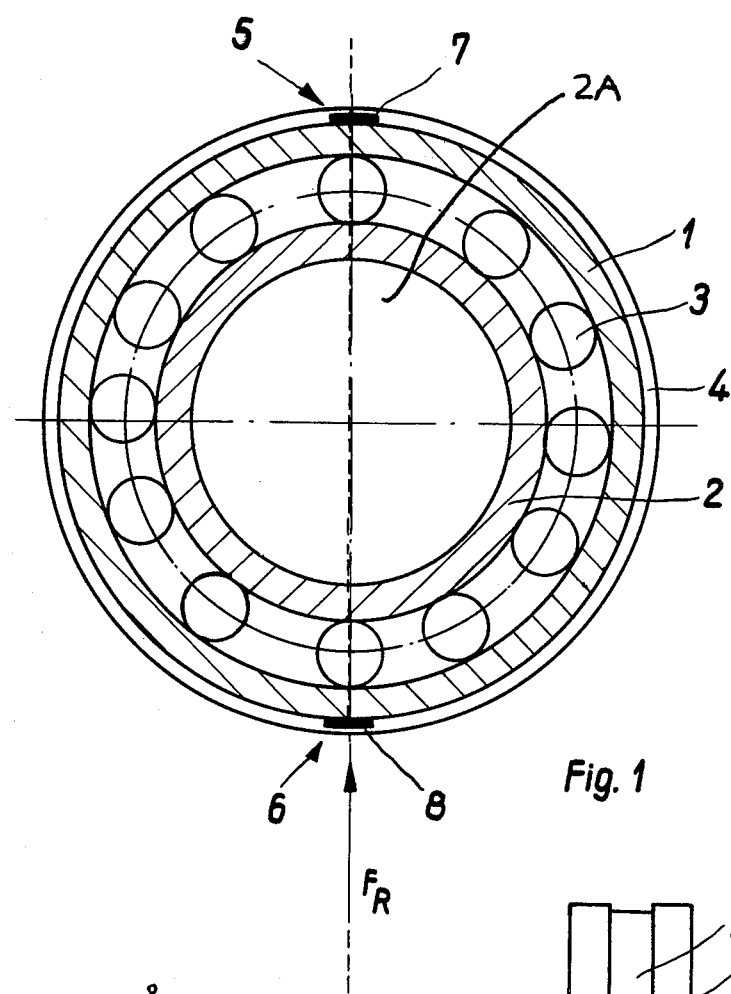
FIG. 1 shows a section through a force-measuring bearing of a first apparatus.
Figure 2:
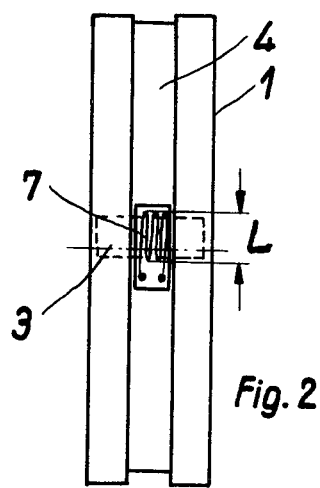
FIG. 2 shows a top view of the bearing according to FIG. 1.

In FIG. 1 the cipher 1 designates a stationary outer ring of a preloaded roller bearing, and 2 a rotating inner ring mounted on a spindle 2A. Between the two rings roll bodies 3 are arranged. On the outer surface of the outer ring 1 is a circular groove 4. At two opposite measuring points 5 and 6 strain gauges 7 and 8 are glued into the groove 4. The position of the strain gauges is shown in FIG. 2, from which can also be seen that the length L of the measuring grid was selected in such a manner that it is no or only little larger than the extent of the cross section of the roll bodies 3 projected on the outer ring 1 in peripheral direction. The external force $F_R$ to be measured acts on the spindle 2A and changes the stresses caused by internal forces. The stress at point 5 increases while the stress at point 6 decreases accordingly.

Figure 3:
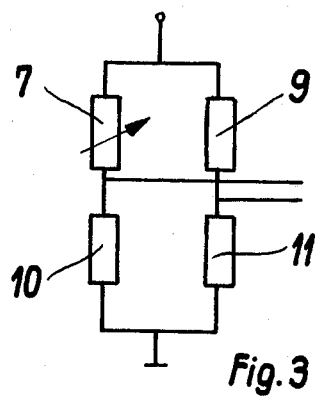
FIG. 3 shows the arrangement of a strain gauge at a measuring point of the force-measuring bearing according to FIG. 1.
Figure 4:
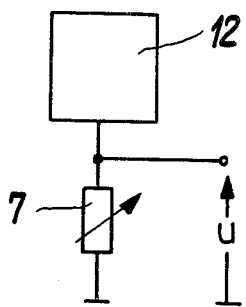
FIG. 4 shows a modified connecting arrangement.

As schematically represented in FIG. 3, each strain gauge 7 and/or 8 is placed with fixed resistors 9, 10 and 11 into a bridge circuit. Instead of a bridge circuit to record the resistance variation brought about by the rolling over of the gauge, a connection of the kind shown in FIG. 4 can also be used, i.e. a connection in which a gauge is connected to a source of constant current 12, and in which the voltage drop is recorded at the gauge 7.

Figure 5:
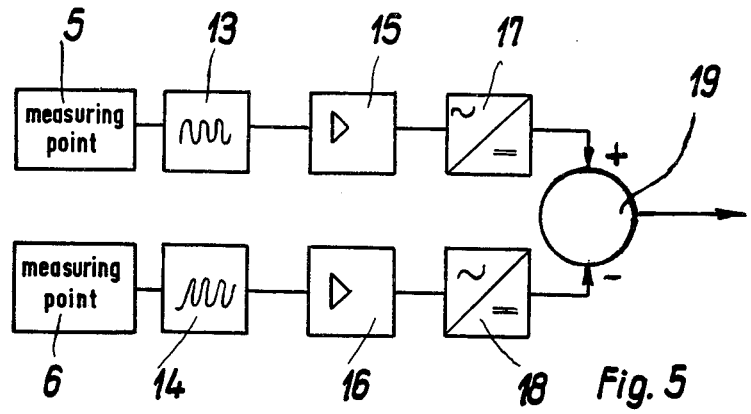
FIG. 5 shows the block diagram of two measuring points.

The voltages proportional to the roll-over strains are amplified and rectified. FIG. 5 shows the block diagram of the measuring arrangement. From the measuring points 5 and 6 the signal, via high-passes 13 and 14, arrives at the amplifiers 15 and 16, to which the rectifiers 17 and 18 are outlet-connected. The signals coming from the rectifiers 17 and 18 are supplied to a subtracting instrument 19, in which a subtraction takes place. Because the internal forces are applied with the same level to both measuring points their influence is eliminated by the subtraction device, while the signal levels due to external forces change in opposite directions.

Figure 6:
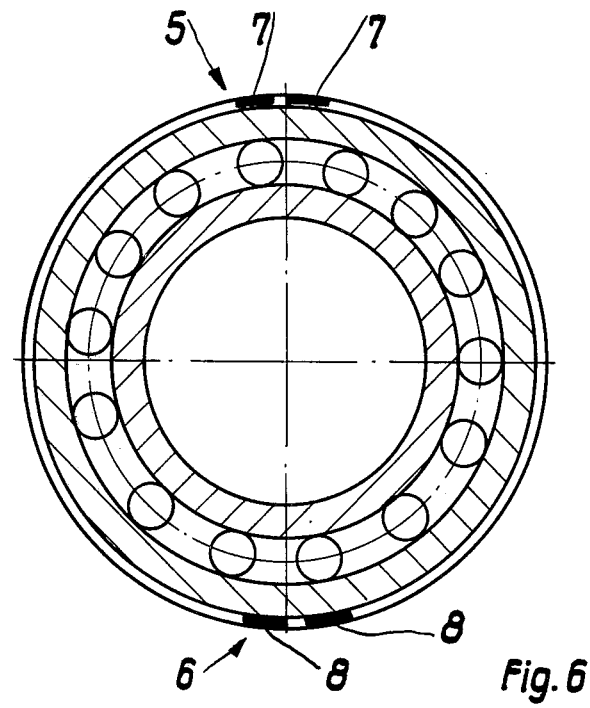
FIG. 6 shows a section through a force-measuring bearing of which the measuring points exhibit two strain gauges.

FIG. 6 shows a modified embodiment of a force-measuring bearing, in which each measuring point 5 and/or 6 is provided with two strain gauges 7 and/or 8. The distance between the strain gauge 7 of a measuring point corresponds to one half the distance between two consecutive roll bodies. The advantage of having measuring points with two strain gauges connected in a semi-bridge arrangement, consists in a doubling of the amplitude of the alternating signal, as compared to the arrangement with only one active strain gauge.

Figure 7:
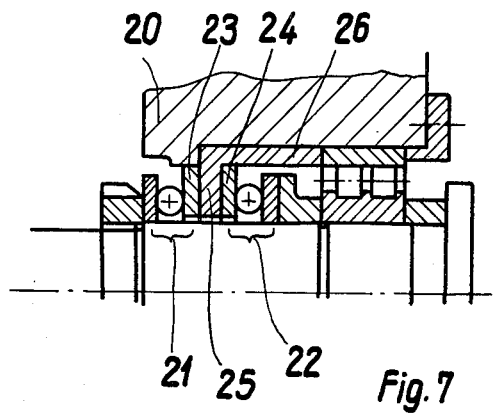
FIG. 7 shows an apparatus for the measurement of axial forces.
Figure 8:
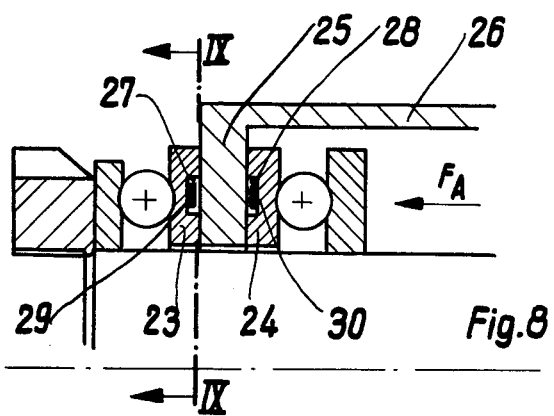
FIG. 8 shows a detail of the apparatus according to FIG. 7.
Figure 9:
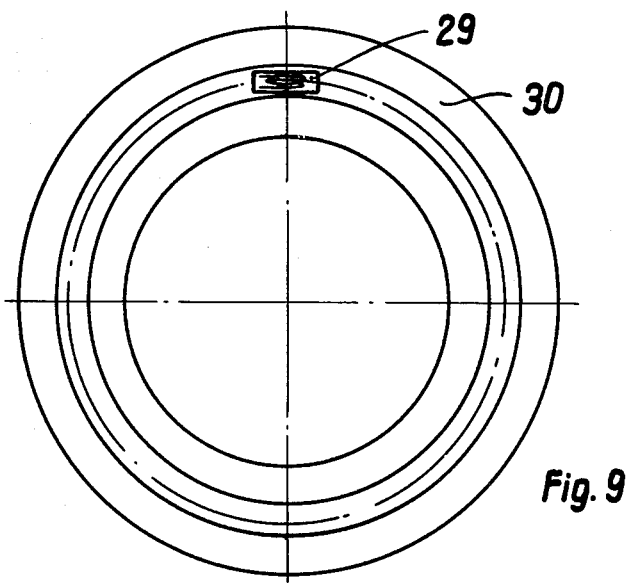
FIG. 9 shows a section along the line IX-IX in FIG. 8.

FIG. 7 shows a spindle bearing in a housing 20. To this bearing belong two axial bearings 21 and 22. A stationary bearing ring 23 and/or 24 of both axial bearings abuts to the flange 25 of a bushing 26 which is firmly connected to the housing. As can be seen from FIG. 8, the bearing rings 23 and 24 are provided with annular grooves 27 resp. 28. Strain gauges 29 resp. 30 are glued into the groove. The position of the strain gauge 29 in the bearing ring 23 is also shown in FIG. 9. The strains of both strain gauges 29 and 30 are, with an unloaded axial bearing, a measure for the internal forces active in the bearing. Through the separate amplification and rectification of the resistance variation, occurring at both strain gauges and the subsequent subtraction, these signals are eliminated. When an axial force $F_A$ acts on the axial bearing, the strain gauge 30 will be loaded more than the strain gauge 29. The signal at the outlet of the subtracting connection is consequently proportional to the outer axial load. Since the bearing is uniformly loaded over the circumference by the axial force, the arrangement of the measuring points, i.e. their angular position, can be freely selected. Naturally, also in the apparatus according to FIGS. 7-9, each measuring point can be equipped with two strain gauges, in which case both gauges have to be arranged staggered at a distance from each other and which corresponds to one half of the roll body distance.

Figure 10:
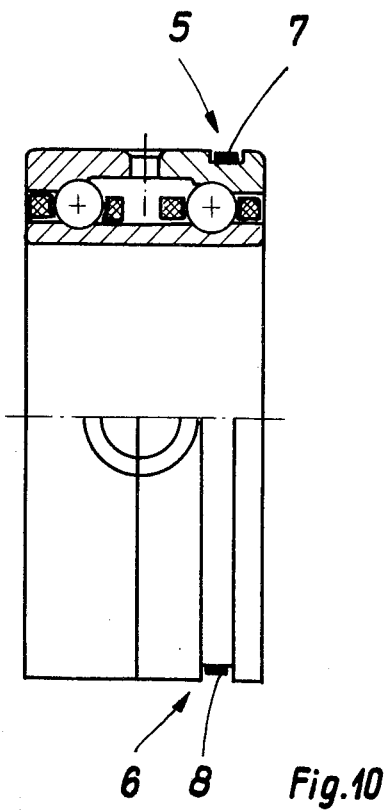
FIG. 10 shows the arrangement of strain gauges in a special bearing.

FIG. 10 shows the placing of the strain gauges 7 and 8 at the measuring points 5 and 6 of an inclined ball bearing. In order to reach maximum sensitivity, the strain gauges 7 and 8 are arranged opposite to each other, in the line of application of the force to be measured in the outer ring. Also the strain gauges 7 and 8 are placed across in separate Wheatstone bridges. It is again possible, of course, to equip both measuring points 5 and 6 with two strain gauges.

Figure 11:
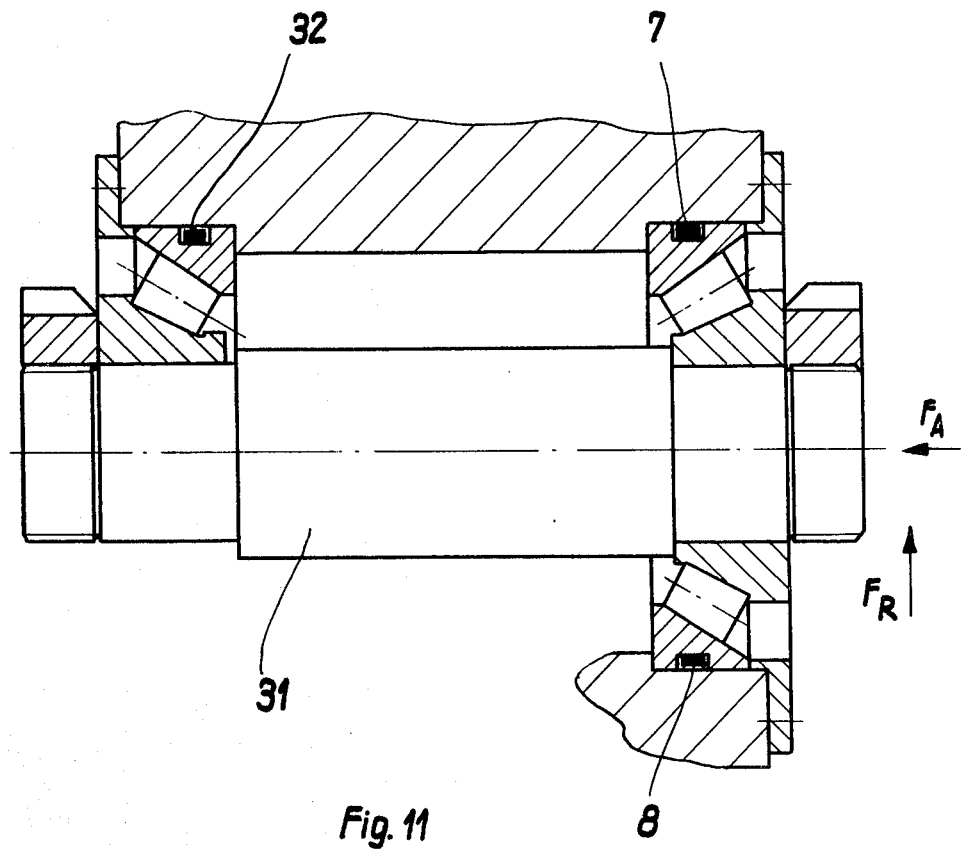
FIG. 11 shows a force-measuring apparatus with conical roller bearings.

FIG. 11 finally shows an apparatus which serves to measure the axial forces and radial forces $F_A$ resp. $F_R$ exerted on a shaft 31 resting in conical roller bearings. The radial forces $F_R$ can be recorded by means of the strain gauges 7 and 8. To measure an axial force $F_A$, the strain gauges 7 and 32 are combined. When measuring an axial force, the strain gauge 7 is loaded more than the strain gauge 32.

I claim:

1. An apparatus for measuring forces by means of at least one roller bearing having at least two rings, at least one of said rings being an inner ring and at least one of said rings being an outer ring, and at least a first and a second strain gauge mounted to said roller bearing at different points of said roller bearing to record the forces to be measured, first and second amplifiers electrically coupled to said first and second strain gauges respectively for individually amplifying the resistance variations of said first and second strain gauges respectively, said apparatus characterized in that said roller bearing is preloaded and that the apparatus includes a first and a second rectifier electrically coupled to the outputs of said first and second amplifiers respectively so that the measured values from at least two measuring points on the roller bearing are individually rectified, and a subtractor electrically coupled to the outputs of said first and second rectifiers for subtracting the signals from said first and second rectifiers, wherein the results of said subtraction of said individually amplified and rectified signals results in a signal which is proportional to the external forces to be measured and said resulting signal does not include components of the individually amplified and rectified signals due to internal forces of said roller bearing.

2. Apparatus according to claim 1, with the characteristic that the measuring points (5, 6) of which the signals are subtracted, lie opposite to one another.

3. Apparatus according to claims 1 or 2, with the characteristic that at each measuring point (5, 6), two strain gauges are arranged.

4. Apparatus according to claims 1 or 2, with the characteristic that the length (L) of the grid of the strain guages (7, 8, 29, 30, 32) is at most equal to the length of the projections of roll bodies (3) positioned between said inner and outer rings on the measuring point.

5. Apparatus according to claims 1 or 2, with the characteristic that the recorded measured values are supplied via high-passes (13, 14) to said amplifiers (15, 16) from where they arrive via said rectifiers (17, 18) at said subtractor (19).

6. Apparatus according to claims 1 or 2 with the characteristic that the roller bearing is designed as a radial bearing.

7. Apparatus according to claims 1 or 2 with the characteristic that the roller bearing is designed as a thrust bearing.

8. Apparatus according to claims 1 or 2 with the characteristic that the roller bearing is designed as an inclined ball bearing.

9. Apparatus according to claims 1 or 2 with the characteristic that the roller bearing is designed as a ball roller bearing.

10. In an apparatus for measuring forces by means of at least one roller bearing having at least two rings, at least one of said rings being an inner ring and at least one of said rings being an outer ring, and at least a first and a second strain gauge mounted to said roller bearing at different points of said roller bearing to record the forces to be measured, said roller bearing being preloaded, the improvement comprising:

first and second amplifiers electrically coupled to said first and second strain gauges respectively for individually amplifying the resistance variations of said first and second strain gauges respectively.

first and second rectifiers electrically coupled to the outputs of said first and second amplifiers, respectively, so that the measured values from at least two measuring points on the roller bearing are individually rectified, and a subtractor electrically coupled to the outputs of said first and second rectifiers for subtracting the signals from said first and second rectifiers, wherein the results of said subtraction of said individually amplified and rectified signals results in a signal which is proportional to the external forces to be measured and said resulting signal does not include components of the individually amplified and rectified signals due to internal forces of said roller bearing.

11. An apparatus as claimed in claim 10 further including first and second high passes (13, 14) interposed between said first and second strain gauges and said first and second amplifiers, respectively.

* * * * *

UNITED STATES PATENT AND TRADEMARK OFFICE
CERTIFICATE OF CORRECTION

PATENT NO. : 4,203,319
DATED : May 20, 1980
INVENTOR(S) : Gerhard B. Lechler

It is certified that error appears in the above—identified patent and that said Letters Patent is hereby corrected as shown below:

Column 1, line 22, "the" first occurrence should read -- two --.

Signed and Sealed this

Ninth Day of September 1980

[SEAL]

Attest:

SIDNEY A. DIAMOND

Attesting Officer     Commissioner of Patents and Trademarks